United States Patent [19]
Kunio

[11] 3,869,029
[45] Mar. 4, 1975

[54] SLIDING SHOE IN VEHICULAR PANTAGRAPH COLLECTOR

[75] Inventor: Shibayama Kunio, Kawasaki, Japan

[73] Assignee: Fuji Denki Seizo Kabushiki Kaisha, Kanagawa-ken, Japan

[22] Filed: Oct. 5, 1973

[21] Appl. No.: 403,887

[30] Foreign Application Priority Data
Oct. 6, 1972    Japan.............................. 47-10051

[52] U.S. Cl..................... 191/49, 191/59.1, 191/45
[51] Int. Cl................................................. B60l 5/38
[58] Field of Search ......... 191/45 R, 47, 48, 49, 59, 191/59.1, 57

[56] References Cited
UNITED STATES PATENTS
3,727,729   4/1973   Payen................................ 191/45 R
3,733,446   5/1973   Colovas............................... 191/49

Primary Examiner—M. Henson Wood, Jr.
Assistant Examiner—D. W. Keen
Attorney, Agent, or Firm—Holman & Stern

[57] ABSTRACT

A sliding shoe in a pantagraph collector provided on vehicles such as super-express trains is provided with pan-plate pieces, pan-plate supporting pieces combined with the pan-plate pieces to form assemblies respectively, a sliding shoe frame for accommodating these assemblies, and elastic connecting means for elastically supporting the assemblies on the sliding shoe frame, thereby allowing the pantagraph collector to follow a relatively small amplitude and a relatively high oscillation frequency of an aerial line.

5 Claims, 6 Drawing Figures

PATENTED MAR 4 1975　3,869,029

SLIDING SHOE IN VEHICULAR PANTAGRAPH COLLECTOR

BACKGROUND OF THE INVENTION

This invention relates to pantagraph collectors on vehicles such as super-express trains, and more particularly to a sliding shoe assembly of the pantagraph collector.

There is a tendency for such a vehicle to increase its speed. For this vehicle, it is important to maintain the effective performance of its pantagraph collector. For this purpose, it is necessary that the pantagraph collector sufficiently follows a catenary curve of an aerial line suspended at certain intervals.

As is shown in FIG. 2, a sliding shoe of a conventional pantagraph collector comprises a hollow sliding shoe frame 1 having a rectangular section and a pan-plate member 2 divided into several parts and fixedly secured on the sliding shoe frame 1 by bolts 4. The sliding shoe thus organized is therefore elastically depressed in its entirety. For instance, suppose that an amplitude and a period of the catenary curve are 0.5 mm. and 40 Hz respectively. In this case, with the conventional pantagraph collector, an oscillation frequency of the aerial line becomes greater than that which is determined by the mass and elastic modulus of the sliding shoe. As a result, the conventional pantagraph collector cannot sufficiently follow the oscillation of relatively small amplitude and high frequency of the aerial line, and accordingly the performance of the pantagraph collector is considerably lowered.

A countermeasure against this difficulty accompanying the conventional pantagraph collector is to decrease the mass of the sliding shoe or to increase the elastic modulus thereof. However, there is obviously a certain limitation in the decrease of the mass of the sliding shoe. On the other hand, if the elastic modulus is increased, then stress in the aerial line will be increased. As a result, an additional reinforcement of the aerial line is required for withstanding the stress thus increased.

SUMMARY OF THE INVENTION

Accordingly, an object of this invention is to eliminate all of the above-described difficulties accompanying a conventional pantagraph collector.

This object and other objects of the invention have been achieved by the provision of a sliding shoe in a pantagraph collector which comprises a plurality of pan-plate pieces disposed end-to-end in a row, a plurality of pan-plate supporting pieces disposed end-to-end in a row corresponding to the pan-plate pieces, for supporting the latter respectively, the pan-plate supporting pieces being combined with the pan-plate pieces thereby forming assemblies respectively, a sliding shoe frame for accommodating the assemblies, and a plurality of elastic connecting means for elastically supporting the assemblies on the sliding shoe frame.

The manner in which the foregoing objects are achieved by this invention will become more apparent from the following detailed description and the appended claims when read in conjunction with the accompanying drawings, in which like parts are designated by like reference numerals or characters.

BRIEF DESCRIPTION OF THE DRAWINGS

In the accompanying drawings.

DETAILED DESCRIPTION OF THE INVENTION

Figure 1:
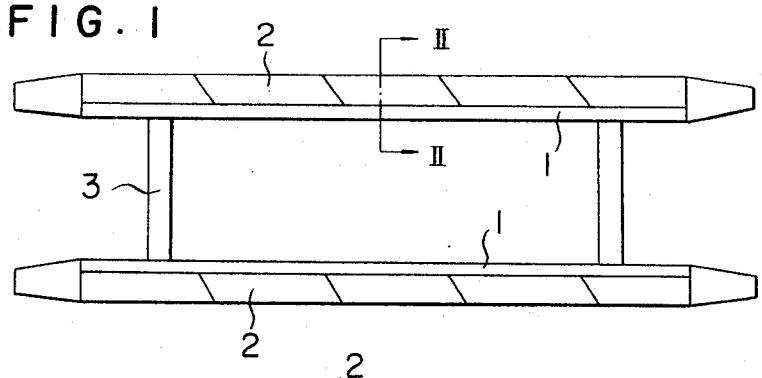
FIG. 1 is a plan view illustrating a sliding shoe assembly of a pantagraph collector.
Figure 2:
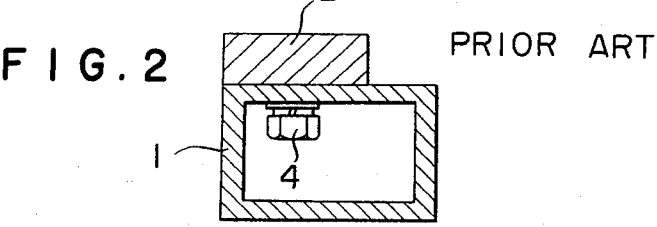
FIG. 2 is a cross sectional view taken along line II—II in FIG. 1, for illustrating the construction of a conventional sliding shoe.

Before describing this invention in detail, it is advisable to insert some preliminary remarks on a sliding shoe in a pantagraph collector with reference to FIG. 1.

In FIG. 1, there is shown a sliding shoe assembly comprising two sliding shoes in a pantagraph collector, which comprises a pair of sliding shoe frames 1 and a pair of pan-plates 2 respectively provided on the frames 1. The sliding shoe frames 1 are fixedly connected by connecting frames 3, near the ends thereof, as is shown in FIG. 1.

Each of the pan-plate 2 is divided into several pieces (hereinafter referred to as pan-plate pieces 2) by cuts obliquely transverse with respect to the longitudinal direction of the frame 1, and the pan-plate pieces thus obtained are disposed end-to-end in a row so that the pan-plates 2 may cause no frictional resistance against an aerial line when the pantagraph collector, or the pan-plates 2, are moved along the aerial line. Ordinarily, of the pan-plate pieces, the centrally positioned one is worn out earlier than the others. In this case, all that is necessary for the repair of the sliding shoe is to replace the central pan-plate piece. This is one of the reasons why the pan-plate comprises several pan-plates pieces 2.

Figure 3:
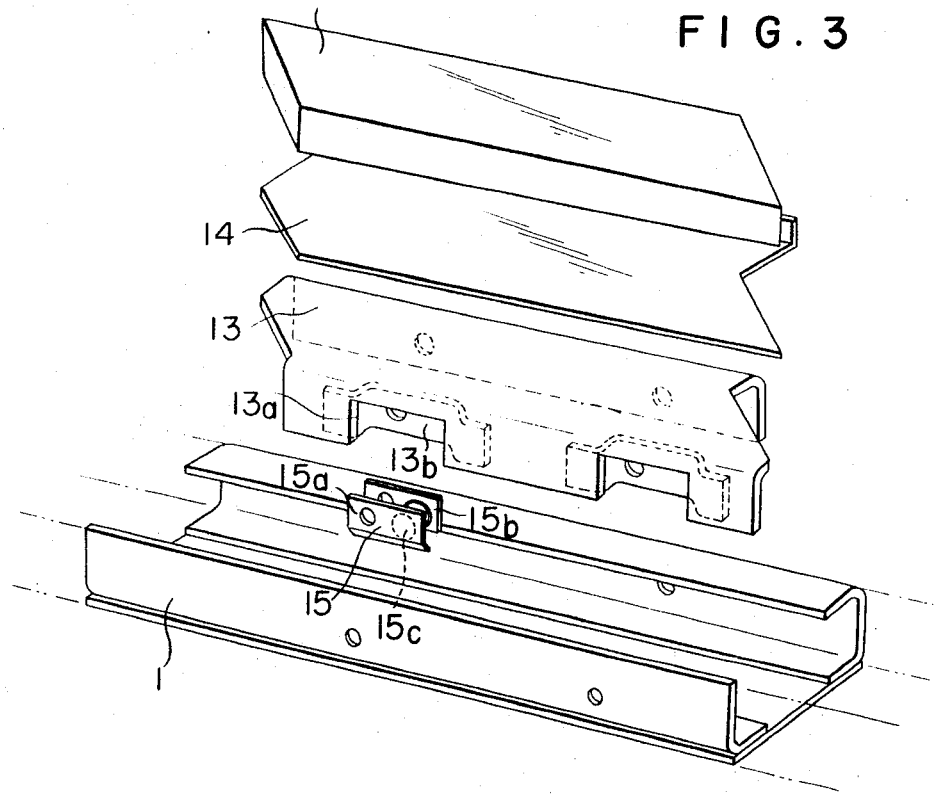
FIG. 3 is an exploded view of a sliding shoe according to the invention.
Figure 4:
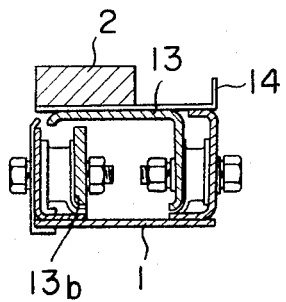
FIG. 4 is a cross-sectional view of the sliding shoe, according to the invention, sectioned along a line corresponding to line II—II in FIG. 1.

A sliding shoe according to the invention will be described with reference to FIGS. 3, 4 and 5. The sliding shoe comprises a sliding shoe frame 1 whose section is substantially like a character U, a pan-plate supporting member 13 whose section is like a character U upset and accommodated in the sliding shoe frame 1, the above-described pan-plate pieces 2 each fixedly supported through a grease holding member 14 on the pan-plate support member 13 by means of bolts, and elastic connecting pieces 15 for supporting the pan-plate supporting member 13 on the frame 1.

The pan-plate supporting member 13 and the grease holding member 14 are respectively divided into several pieces (hereinafter referred to as pan-plate supporting pieces 13 and grease holding pieces 14 respectively) in such a manner that each of the pieces thus cut has its ends substantially similar to the obliquely cut ends of the pan-plate piece. In addition, as is apparent from FIG. 4, the grease holding piece 14 is provided with a grease pool at its rear portion as viewed from the forward direction of the pantagraph collector. Grease held in this grease pool serves to reduce frictional resistance caused between the pan-plate and the aerial line.

In this sliding shoe, the pan-plate piece 2 is supported on the frame 1 in such a manner that the front surface of the former 2 is substantially flush with that of the latter 1, as a result of which the front wall of the pamplate supporting piece 13 is very close to that of the frame 1. Accordingly, it would be difficult to mount the pan-plate supporting piece 13 on the frame 1 unless they are modified.

In order to overcome this difficulty, there are provided slots 13a on the pan-plate supporting piece 13, and supporting plates 13b respectively mounted over the slots 13a by the use of rivets inside the pan-plate supporting piece 13. The previously described elastic connecting pieces 15 are accommodated in the spaces formed by the slots 13a and the supporting plates 13b, and are then secured between the supporting plates 13b and the frame 1 by bolt-nut assemblies 16 and 17 as is shown in FIG. 5.

The elastic connecting piece 15 comprises a pair of mounting plates 15a and 15b and a rubber piece 15c adhesively connected between the mounting plates 15a and 15b. The mounting plate 15a and 15b are secured on the front wall of the frame 1 and the supporting plate 13b by the bolt-nut assemblies 16 and 17 respectively.

Figure 5:
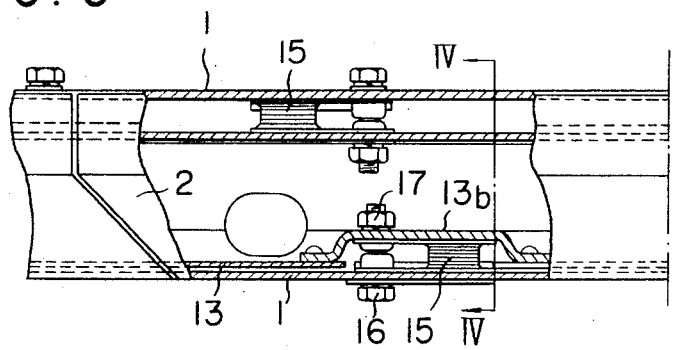
FIG. 5 is a side view with parts cut away, illustrating the sliding shoe shown in FIGS. 3 and 4

For the installation of the elastic connecting piece 15 between the rear wall of the frame 1 and that of the pan-plate supporting piece 13 no special mechanical means such as the above-described slots and mounting plates is necessary, as is apparent from FIG. 5.

As the pan-plate pieces 2 are thus individually elastically supported on the sliding shoe frame in the sliding shoe according to this invention, only the pan-plate piece or pan-plate pieces in contact with the aerial line are depressed or displaced in accordance with the conditions of the aerial line, that is, the mass of what is depressed or displaced by the aerial line is reduced when compared with that of the conventional sliding shoe. Thus, a pantagraph collector employing the sliding shoe according to the invention can follow the oscillation of high frequency of an aerial line.

Figure 6:
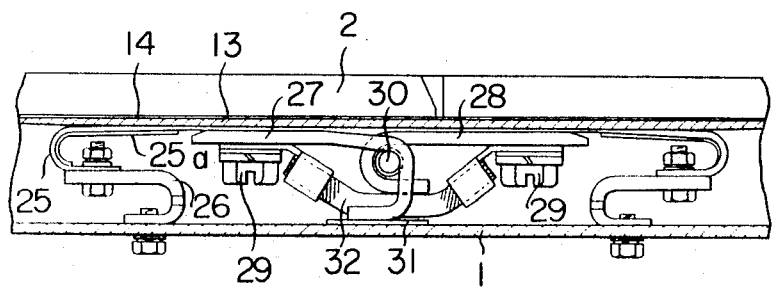
FIG. 6 is a side view with parts cut away, illustrating another example of the sliding shoe according to this invention.

Another example, or a modification, of the sliding shoe according to this invention is shown in FIG. 6, which comprises a sliding shoe frame 1, a pan-plate 2, a pan-plate supporting member 13 and a grease holding member 14 which are the same in construction as those described with reference to FIGS. 3, 4 and 5, and further comprises a leaf spring 25 which is one of the parts different from those of the first example.

In this modification, the leaf spring 25 is employed instead of the elastic connecting piece 15 of the first example. One of the ends of the leaf spring 25 is fixedly secured on a supporting piece 26 mounted on the bottom plate of the frame 1, while the other end is horizontally extended to elastically support the upper plate of the pan-plate supporting piece 13.

The pan-plate pieces, the grease holding pieces and the pan-plate supporting pieces form assemblies which are arranged end-to-end along the sliding shoe frame.

The adjacent end portions of the assemblies thus arranged are movably coupled by hinge pieces 27 and 28 provided respectively under the adjacent end portions and by a pin 30 pivotally mounting these hinge pieces 27 and 28. One end of the hinge piece 27 extends downwardly to contact a rubber plate 31 laid on the bottom plate of the sliding shoe frame 1 so that a sinking quantity, or a downward displacement, of the adjacent ends of the assemblies is elastically limited.

The sliding shoe shown in FIG. 6 further comprises: auxiliary springs 25a provided along the leaf springs 25; bolts 29 for fixedly securing on the pan-plate pieces 3 the end portions of the leaf springs 25 and the end portions of the hinge pieces 27 and 28; flexible conductors 32 secured by the bolts 29, for electrically connecting the pan-plate pieces 2.

Thus, also in this example of the sliding shoe, the pan-plate pieces 2 are individually elastically supported on the sliding shoe frame 1. Accordingly, a pantagraph collector provided with the sliding shoe thus organized can follow a relatively high vibration of an aerial line.

What is claimed is:

1. A sliding shoe in a pantagraph collector which comprises
   a. a plurality of pan-plate pieces disposed in abutting end-to-end relationship in a row for following a power supply line;
   b. a plurality of pan-plate supporting pieces disposed in abutting end-to-end relationship in a row corresponding to the pan-plate pieces, for supporting the latter respectively, the pan-plate supporting pieces being connected to the pan-plate pieces thereby forming assemblies respectively,
   c. a sliding shoe frame for accommodating the assemblies, and
   d. a plurality of elastic connecting means for elastically supporting the assemblies on the sliding shoe frame.

2. A sliding shoe as claimed in claim 1 in which said elastic connecting means comprises two mounting plates and a rubber piece adhesively secured between the two mounting pieces, one of the two mounting plates being connected on said sliding shoe frame while the other mounting plate being connected on said assembly.

3. A sliding shoe as claimed in claim 2, wherein the assemblies further include a grease holding member arranged between the associated pan-plate piece and the pan-plate supporting piece.

4. A sliding shoe as claimed in claim 3, wherein the elastic connecting means further includes slots provided on the pan-plate supporting pieces, and supporting plates mounted inside the pan-plate supporting pieces and over the slots, the other mounting plate being connected on a respective supporting plate.

5. A sliding shoe as claimed in claim 1 in which said elastic connecting means comprises a leaf spring for elastically supporting said assembly on said sliding shoe frame.

* * * * *